Figure 1:
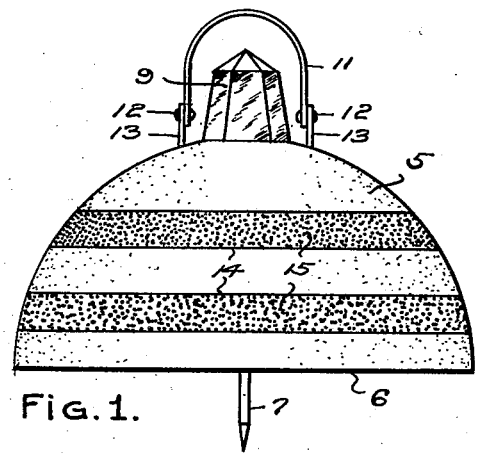

April 20, 1954   F. McGRATH   2,675,739
LIGHT REFLECTIVE SIGNAL MARKER
Filed Sept. 15, 1951

INVENTOR.
FRANCIS McGRATH,
BY
ATTORNEY.

Patented Apr. 20, 1954

2,675,739

UNITED STATES PATENT OFFICE 2,675,739

LIGHT REFLECTIVE SIGNAL MARKER

Francis McGrath, Hallandale, Fla.

Application September 15, 1951, Serial No. 246,791

1 Claim. (Cl. 88—79)

This invention relates to improvements in visual signal devices of a portable nature and embodying novel light reflecting means so constructed and arranged that light rays from a source of illumination will be reflected from substantially any angle with equal brilliance.

It is an object of the invention to provide a portable visual signal device having a body portion that is preferably formed of molded material calculated to withstand any major force that might be exerted thereon, embodies light reflecting means anchored therein and formed of a material calculated to withstand considerable shock, is readily transportable from place to place and is provided with ground piercing means to prevent accidental shifting of the device.

The device of the present invention readily adapts itself as lawn or driveway markers, parking area markers, highway markers, excavation markers and many other uses where a reflected illumination is essential as a warning signal.

Novel features of construction will be more readily presented during the course of the following description, reference being had to the accompanying drawings, wherein has been illustrated a preferred form of the device and wherein like characters of reference are employed to denote like parts throughout.

Figure 2:
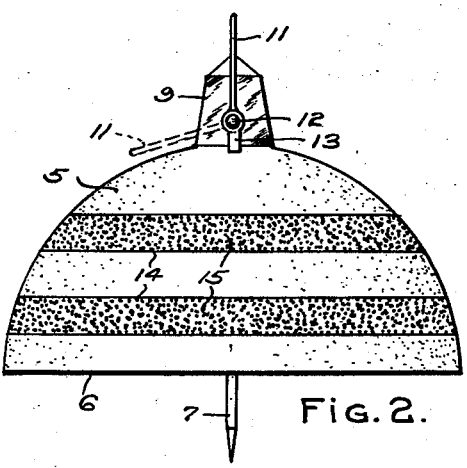
Figure 3:
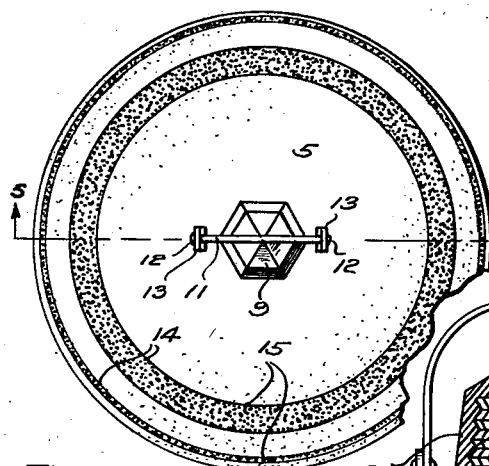
Figure 4:
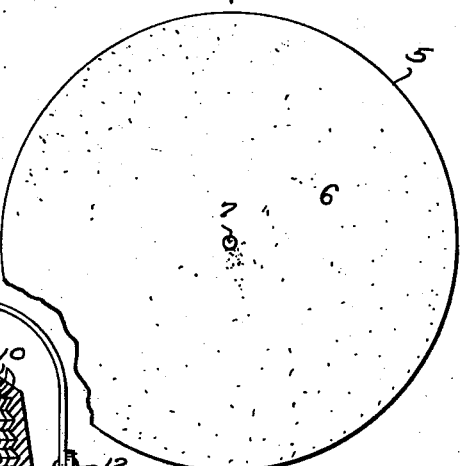
Figure 5:
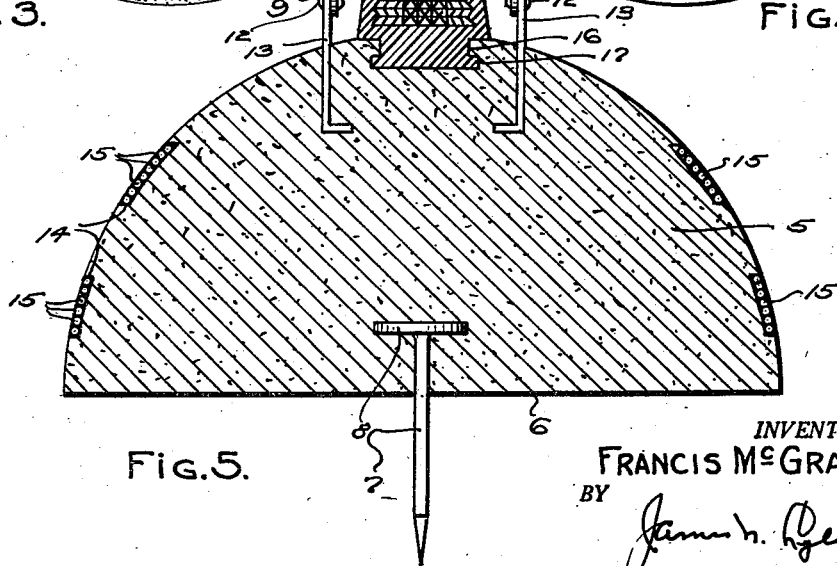

In the drawings:

Figure 1 is a side elevation of a device constructed in accordance with the invention, Figure 2 is a similar view at right angles to Figure 1, Figure 3 is a top plan view of the device, Figure 4 is a bottom plan view of the device and, Figure 5 is a central vertical sectional view of the device, taken on line 5—5 of Figure 3.

Referring specifically to the drawings, the numeral 5 designates a body portion that is semi-spherical in shape and preferably formed of concrete. The body portion has a flat base 6, for resting engagement upon the ground or other surface. To prevent accidental shifting of the signal device after location, a stake 7, having a flat head 8 is molded into the body portion and projects below the base centrally thereof. The device when located, is adapted to have the stake forced into the ground or other surface and will be maintained in such location against shifting should the body be struck by the wheels of a vehicle.

A reflecting beacon device, illustrated by the numeral 9, is adapted to be positioned at the top center of the body portion, as clearly shown. The beacon 9 is formed of plastic or the like, preferably of a red color and translucent. The beacon is preferably hollow and its inner walls are molded in the form of closely arranged prisms 10. The beacon as shown, is hexagonal and upwardly tapering, although the invention is not confined to the particular shape, since a semi-spherical, octagonal or conical shape may be employed with success.

To facilitate the handling of the device, a bale handle 11 has been provided. The handle 11 is pivotally connected at 12, to upstanding ears 13, formed on anchor devices, the lower ends of which are molded into the body 5 during manufacture. The handle 11, when not in use, may be swung downwardly, as shown in dotted lines in Figure 2.

To increase the reflective signal qualities of this device, the body portion 5 is provided with spaced apart concentric grooves 14, into which are cemented or otherwise attached, beads 15 or other light reflective brilliants, also preferably formed red. While the beacon and bands of beads are formed red, it will be readily apparent that other colors, such as amber or green may be employed where the device is to be employed to denote special areas. As shown, the beacon is closed at its lower end and is undercut at 16 to provide a flange 17 that is molded into the body 5 during the manufacture of the device. The purpose in closing the lower end of the beacon, is to prevent the concrete mix from entering the beacon during the process of molding, since the device will probably be manufactured or molded in an inverted position.

In use, the signal device or devices are transported to the particular place of use and set upon the ground, roadway, parking area or an obstruction and the stake forced into the ground. The handle 11 may then be turned down to prevent damage thereto, should the device be struck by the wheels of a vehicle. The red beacon and the red bands of beads will be readily visible during the day, while at night, the light rays from an oncoming vehicle will cause the beacon and bands to reflect a brilliant glow. The structure is capable of withstanding considerable shock without damage. The device readily adapts itself as an intersection marker and in cases where there is a suspended intersection light, the signal device will be placed directly below it and light rays directed downwardly from the intersection light will cause the signal to glow, due to the angularity of the beacon. The device is cheap to manufacture and is highly effective in use.

It is to be understood, that the invention is not limited to the precise shape and arrangement of parts, but that changes may be made as fairly come within the scope or the spirit of the appended claim.

Having described my invention, what I claim as new and desire to secure by Letters Patent is:

A light reflecting signal marker that consists of a semi-spherical weighted body of concrete having a flat ground engaging base, a pointed ground piercing stake having a head molded into the body portion with the stake projecting below the base centrally and axially thereof, a translucent beacon supported at the top of the body portion centrally and axially thereof, the beacon formed hollow and having a flanged base that is molded into the body portion, the beacon being hexagonal in horizontal cross-section and tapering upwardly from the base, each of the side walls of the beacon being formed flat, the inner walls of the beacon being hexagonal and molded to provide a plurality of closely arranged light reflecting prisms, the body portion provided with a pair of spaced apart grooves that are concentric with the marginal edge of the base and light reflecting beads cemented in and completely filling the grooves to the outer surface of the body portion.

References Cited in the file of this patent

UNITED STATES PATENTS

| Number | Name | Date |
|---|---|---|
| 1,468,763 | Temple et al. | Sept. 25, 1923 |
| 1,520,774 | Scherle | Dec. 30, 1924 |
| 1,635,267 | Feinberg | July 12, 1927 |
| 1,685,449 | Durand | Sept. 25, 1928 |
| 1,789,525 | Hoff | Jan. 20, 1931 |
| 1,906,668 | Valk | May 2, 1933 |
| 2,094,741 | Grussendorf et al. | Oct. 5, 1937 |
| 2,108,370 | Ernst | Feb. 15, 1938 |
| 2,229,179 | Langdon | Jan. 21, 1941 |
| 2,529,576 | Scanlon | Nov. 14, 1950 |

FOREIGN PATENTS

| Number | Country | Date |
|---|---|---|
| 414,604 | Germany | June 6, 1925 |